(12) United States Patent
Hekmatshoartabari et al.

(10) Patent No.: US 10,671,351 B2
(45) Date of Patent: Jun. 2, 2020

(54) LOW-POWER RANDOM NUMBER GENERATOR

(71) Applicant: International Business Machines Corporation, Armonk, NY (US)

(72) Inventors: Bahman Hekmatshoartabari, White Plains, NY (US); Ghavam Shahidi, Pound Ridge, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/108,410

(22) Filed: Aug. 22, 2018

(65) Prior Publication Data

US 2020/0065068 A1 Feb. 27, 2020

(51) Int. Cl.
*G06F 7/58* (2006.01)
*H04L 9/08* (2006.01)
*H03K 3/84* (2006.01)

(52) U.S. Cl.
CPC ............. *G06F 7/588* (2013.01); *H03K 3/84* (2013.01); *H04L 9/0869* (2013.01)

(58) Field of Classification Search
CPC ...................................................... G06F 7/588
See application file for complete search history.

(56) References Cited

U.S. PATENT DOCUMENTS

| 7,007,060 | B2 | 2/2006 | Miller, Jr. | |
| 2006/0218212 | A1* | 9/2006 | Mattison | H03K 3/84 708/251 |
| 2016/0216945 | A1* | 7/2016 | Rosca | G06F 7/588 |
| 2017/0161022 | A1* | 6/2017 | Chen | G06F 7/582 |

FOREIGN PATENT DOCUMENTS

WO 2016190879 A1 12/2016

OTHER PUBLICATIONS

Cobinet et al., "Electrical Noise Generators", IRE Proc. (1947), 5 pages.
Disclosed Anonymously "An efficient methodology to achieve the best possbile wiring design compromise to achieve the targeted specifications applied to large silicon devices arrays" IP.com No. IPCOM000241696D, IP.com Publication Date: May 22, 2015, 5 pages.

(Continued)

*Primary Examiner* — Chuong D Ngo
(74) *Attorney, Agent, or Firm* — Cantor Colburn LLP; Vazken Alexanian

(57) ABSTRACT

Embodiments are directed to an integrated circuit for a low-power random number generator that uses a thin-film transistor. Embodiments of the integrated circuit include one or more front-end devices formed on a substrate, and one or more interlayer dielectric (ILD) layers formed on the one or more front-end devices. Embodiments of the integrated circuit also include one or more back-end devices formed on the one or more ILD layers, wherein the one or more back-end devices are configured to amplify a noise signal and transmit an amplified noise signal to the one or more front-end devices for processing.

24 Claims, 11 Drawing Sheets

(56) References Cited

OTHER PUBLICATIONS

Disclosed Anonymously, "Method for a Protection circuit for a CMOS power amplifier" IP.com No. IPCOM000020405D; IP.com Electronic Publication Date: Nov. 19, 2003; 4 pages.
Disclosed Anonymously, "Piezoelectric Microphone with On-Clip Transistor" IP.com No. IPCOM000147691D; IP.com Electronic Publication Date: Mar. 20, 2007, 3 pages.
Disclosed Anonymously, "Standard Cell Libraries for 3D Monolithic Silocon Technology" IP.com No. IPCOM000247243D; IP.com Electronic Publication Date: Aug. 17, 2016; 5 pages.
International Technology Roadmap for Semiconductors 2.0, "Beyond CMOS" 2015 Edition, 93 pages.
Li et al., "All-optical fast random number generator" Optics Express, 2010, 10 pages.
Li et al., "Brownian motion properties of optoelectric random bit generators based on laser chaos", Optic Express, vol. 24, No. 14, Jul. 2016, 12 pages.
Li et al., "Fully photonics-based physical random bit generation" Optic Letters, vol. 41, No. 14., Jul. 2016, 4 pages.
Liu et al., "117Gbits/s Quantum Random Number Generation with Simple Structure" IEEE Photonics Technology Letters, vol. 29, No. 3, Feb. 1, 2017; 4 pages.
Marandi et al., "All-optical quantum random bit generation from intrinsically binary phase of parametric oscillators" Optic Express, 2012, 9 pages.
Olmschenk et al., "Private random number generation through remote atom entaglement" Photonics Soc. Mtg. (2011), 2 pages.
Somlo, " Zener-Diode Noise Generators" Elect. Lett. (1975) 1 page.
Susans, "Noise Calibrator for V.H.F. and U.H.F. Filed-Strenth-Measuring Receivers" Electronic Letters, Aug. 1967, 2 pages.
Symul et al., "Real time demonstration of high bitrate quantum random number genertion with coherent laser light" Appl. Phys. Lett. (2011), 4 pages.
Tisa et al.,"High-Speed Quantum Random Number Generation Using CMOS Photon Counting Detectors", IEEE Journal of Selected Topics in Quantum Electronics, vol. 21, No. 3, May/Jun. 2015; 7 pages.
Wang et al., "4.5 Gbps high-speed real-time physical random bit generator" Optic Express, 2013, 11 pages.
Xavier et al., "Practical Random Number Generation Protocol for Entanglement-Based Quantum Key Distribution", Quantum Information and Computation, vol. 9, No. 7&8 (2009) pp. 683-692.
Xu et al., "Experimental fast quantum random number generation using high-dimensional entanglement with entropy monitioring" Optica, vol. 3, No. 11, Nov. 2016, 4 pages.

\* cited by examiner

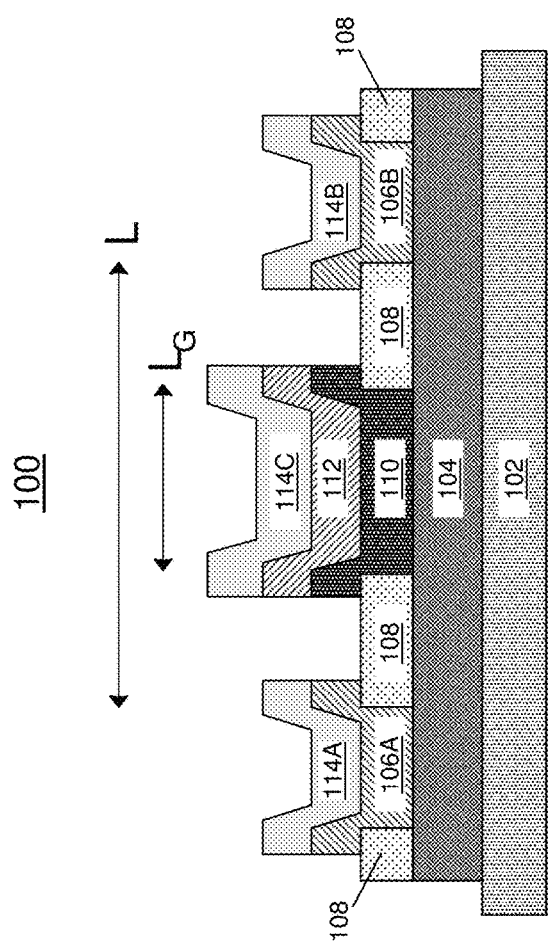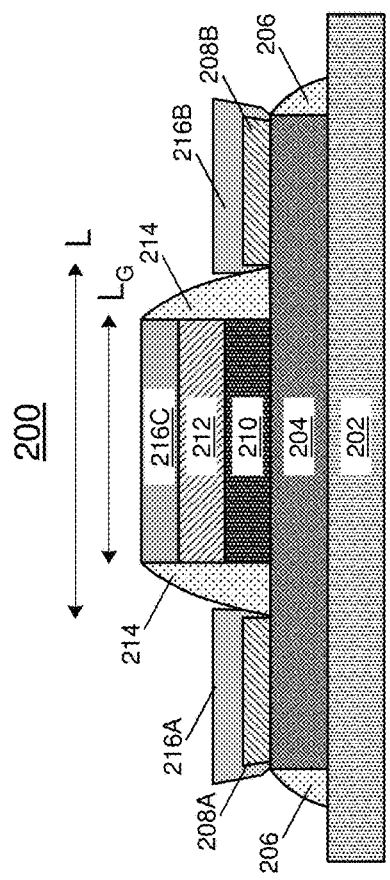

LOW-POWER RANDOM NUMBER GENERATOR

BACKGROUND

The present invention relates in general to semiconductor devices for use in integrated circuits (ICs). More specifically, the present invention relates to improved fabrication methodologies and resulting structures for a low-power random number generator that uses a thin-film transistor (TFT).

Metal oxide semiconductor field effect transistors (MOSFETs) include a source and a drain that are formed in the active region of a semiconductor layer by implanting n-type or p-type impurities in the semiconductor layer. A conventional geometry for MOSTFETs is known as a "planar" geometry because the various parts of the MOSFET device are laid down as planes or layers.

A TFT is a type of FET that can be fabricated by depositing thin films of an active semiconductor layer, dielectric layers, metallic gates, and metallic contacts. A "thin-film" layer's thickness can range from fractions of a nanometer to several micrometers. Faster TFTs can be achieved by using, for example, low temperature polycrystalline silicon (LTPS) or transparent semiconducting oxides (TSOs), thereby potentially expanding TFT application to gate and data drivers or even full systems-on-panel. TFTs can be formed on bulk semiconductor substrates or on semiconductor-on-insulator (SOI) substrates. When bulk semiconductors are used, isolation is provided by implanted wells filled with shallow trench isolation (STI) regions that separate one TFT from another. When SOI is used, TFTs are formed in the semiconductor layer, and no wells are needed because of the isolating material that is already present in the SOI substrate. For liquid-crystal display (LCD) applications, a common non-conductive TFT SOI insulator is glass. This differs from the conventional MOSFET, wherein the insulator of an SOI substrate is typically a dielectric material such as an oxide.

SUMMARY

Embodiments of the present invention are directed to an integrated circuit for a low-power random number generator that uses a thin-film transistor. A non-limiting example of the integrated circuit includes one or more front-end devices formed on a substrate, and one or more interlayer dielectric (ILD) layers formed on the one or more front-end devices. The integrated circuit also includes one or more back-end devices formed on the one or more ILD layers, wherein the one or more back-end devices are configured to amplify a noise signal and transmit an amplified noise signal to the one or more front-end devices for processing.

Embodiments of the present invention are directed to a method for operating a low-power random number generator that uses a thin-film transistor. A non-limiting example of the method includes obtaining, by a back end-device, a noise signal, and amplifying the noise signal by the back-end devices. The method also includes transmitting the amplified noise signal to front-end devices for processing, and generating a random number sequence based at least in part on the amplified noise signal.

Embodiments of the present invention are directed to an integrated circuit for a low-power random number generator that uses a thin-film transistor. A non-limiting example of the integrated circuit includes a plurality of front-devices coupled to a plurality of back-end devices, wherein the plurality of back-end devices comprises a plurality of amplification stages to amplify a noise signal, wherein each of the amplification stages comprises an heterojunction field effect transistor and an active load, wherein the amplification stages have one or more of an increasing DC bias level and a decreasing DC bias level relative to a prior stage, and wherein an output of a given one of the amplification stages is directly applied as an input to a subsequent one of the amplification stages.

Embodiments of the present invention are directed to a method of forming an integrated circuit for a low-power random number generator that uses a thin-film transistor. The method includes forming a first chip including one or more devices formed on a buried oxide (BOX) dielectric layer, forming a second chip including one or more devices formed on a BOX dielectric layer, wherein the first chip is an HJFET chip and the second chip is a CMOS chip, and bonding the first chip to the second chip to form the low power random number generator.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 1 depicts a cross-sectional view of a thin-film HJFET (underlapped structure) in accordance with one or more embodiments of the invention;

FIG. 2 depicts a cross-sectional view of another thin-film HJFET (self-aligned structure) in accordance with one or more embodiments of the invention;

Figure 4:
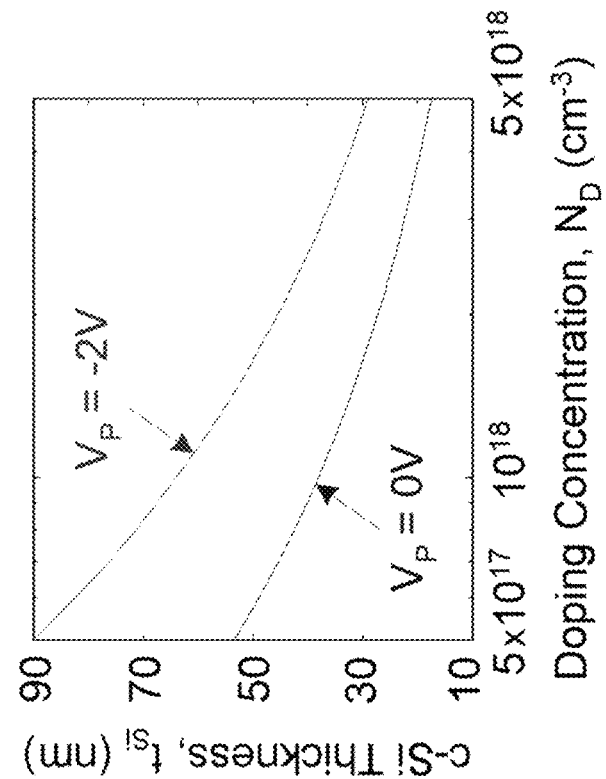
FIG. 4 illustrates a design of a transistor to obtain a desired pinch-off voltage of the transistor based on a crystalline silicon thickness as a function of the doping concentration, and vice versa, according to an embodiment of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

It is understood in advance that, although this detailed description includes illustrations and descriptions of TFTs having particular device configurations, implementation of the teachings recited herein are not limited to a particular type of TFT structure or combination of semiconductor materials. Rather, embodiments of the present invention are capable of being implemented in conjunction with any other type of TFT device or semiconductor material, now known or later developed.

For the sake of brevity, conventional techniques related to semiconductor device and integrated circuit (IC) fabrication may or may not be described in detail herein. Moreover, the various tasks and process steps described herein can be incorporated into a more comprehensive procedure or process having additional steps or functionality not described in detail herein. In particular, various steps in the fabrication of semiconductor devices and semiconductor-based ICs are well known and so, in the interest of brevity, many conventional steps will only be mentioned briefly herein or will be omitted entirely without providing the well-known process details.

Turning now to an overview of technologies that are more specifically relevant to aspects of the invention, a TFT is a type of FET having three terminals (gate, source, and drain) and including semiconductor, dielectric, conductive, and substrate layers. In a conventional TFT configuration, the semiconductor is placed between source/drain electrodes, and the dielectric is located between the gate electrode and the semiconductor. In this TFT configuration, the current between drain and source ($I_{DS}$) is controlled by varying the potential between gate and source ($V_{GS}$), thus inducing free charge accumulation at the dielectric/semiconductor interface. TFTs can be made using a wide variety of semiconductor materials such as Si, SiGe, Ge, GaAs, and the like. The characteristics of a semiconductor-based TFT depend on the crystalline state of the semiconductor. For example, where the semiconductor material is silicon, examples of silicon crystalline states include amorphous silicon, microcrystalline silicon, and/or poly-silicon. The semiconductor layer is disposed on an insulating substrate which can include glass, plastic, dielectric-coated metal foil, or a buried insulator, e.g. of a semiconductor-on-insulator (SOI) substrate.

Enabling a wide range of IoT applications requires chips with small footprint and low power consumption with efficient computing capability and data transmission for communication with other chips. In addition, data security is a crucial requirement. To ensure security, unique random keys may be generated and transferred between chips which are in principle impossible to decode if generated based on truly random numbers rather than pseud0-random numbers which are generated from mathematical algorithms. Random numbers also enable stochastic computing where continuous values are represented by streams of random bits. Complex computations can then be computed by simple bit-wise operations on the streams. Stochastic computing can enable significant energy savings by small reduction in accuracy which can be well tolerated in many IoT applications. Physical sources of random fluctuation however are typically not suitable for IoT applications because they require high power to generate noise, e.g. shot noise of avalanche diodes; the required devices are not compatible with semiconductor technology, e.g. shot noise of vacuum tubes; and/or the generated noise is weak and therefore requires high power to amplify, e.g. thermal noise of a resistor.

Solid-state devices such as avalanche diodes (and to a lesser extent Zener diodes) have been used to generate shot noise. However, this requires high bias voltage and/or current for operation. Additionally, such devices as reversed biased base-emitter junction of bipolar transistors have been used as a noise source for random number generation. However, the required power is too high for IoT applications. On the other hand, if a weak noise source, e.g. thermal noise of a resistor, is used, a high-gain amplifier is needed for amplification. For example, high gain amplifiers require cascading (higher current due to multiple stages), cascoding (higher voltage to ensure transistors remain in saturation), or both. Therefore, these techniques require powers that are too high for ultra-low power IoT applications. The techniques described herein provide a circuit incorporating HJFETs in the back-end of the integrated circuit (IC) in combination CMOS devices in the front-end in a low-power multi-stage amplifier configuration.

Turning now to an overview of the aspects of the invention, one or more embodiments of the invention address the above-described shortcomings of the prior art by providing an integrated circuit for implementing a random number generator using a low-noise input signal. The techniques described herein provide for a hybrid circuit that is capable of generating random numbers with low-power noise that is suitable for portable IoT devices having a limited source of power. The circuit couples a back-end HJFET with a front-end CMOS device, where the HJFET functions as an amplifier to amplify the low-power noise signal from the CMOS device to a sufficient level for use in random number generation. In one or more embodiments of the invention, the HJFETs can be used to form a multi-stage amplifier in the back-end of the integrated circuit. The HJFET can be formed in the back-end using techniques that use laser crystallization of a-Si to form the thin-film transistor. Using short laser pulses and appropriate thermal buffer layers between the back-end and the front-end (e.g. dielectric layers having thickness in the range of 200 nm-2 μm, in some embodiments), the a-Si can be crystallized at low temperatures without damaging the devices formed on the front-end, due to local heating, and fast thermal dissipation. In other embodiments of the invention, the circuit can be formed by bonding a CMOS chip to an HJFET chip. Known techniques can be used to bond the two chips together.

The circuit, including the HJFET and the CMOS, can now be implemented into low-power devices for random number generation given the ability of the HJFET amplifier to amplify the weak noise signals without requiring high power consumption. The HJFET can receive a noise signal from the front-end device as the source for the random number generation. In other embodiments of the invention, the HJFET uses high resistance values in its bias network which can generate thermal noise. The thermal noise generated by the resistors in the bias network or the HJFET itself serves as the noise source. In one or more embodiments of the invention, the HJFET can be configured in a multi-stage amplifier architecture to ensure the noisy signal is at a sufficient level for use. Responsive to amplifying the noise signal using the noise signal to generate a random number and used can be used in applications such as key generation for encryption of data.

The above-described aspects of the invention address the shortcomings of the prior art by forming a hybrid system/circuit with ultra-low-power thin-film HJFET amplifiers that are coupled to a semiconductor chip used to generate random numbers in low-power IoT devices. In embodiments of the invention, the HJFET is formed in the back-end-of-line and is used to amplify a weak noise signal and send the amplified signal to the front-end for further processing.

Figure 5:
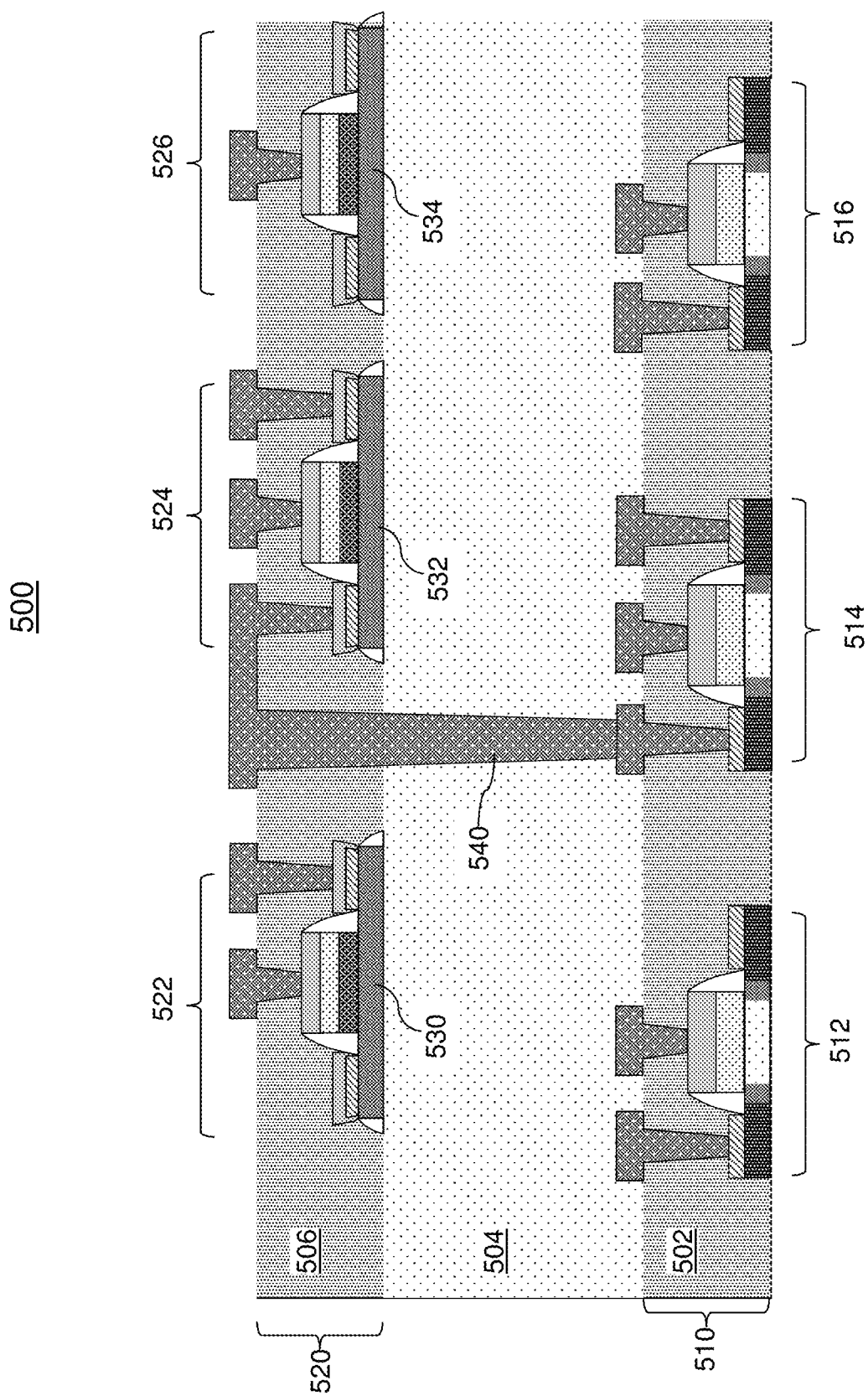
FIG. 5 depicts a cross-section of a circuit including the front-end and back-end device in accordance with one or more embodiments of the invention.

Turning now to a more detailed description of aspects of the present invention, FIG. 1 depicts a cross-sectional view of the thin-film HJFET device 100 having an insulating substrate 102, a low temperature mono or poly silicon channel region 104, source/drain (S/D) regions 106A, 106B, oxide layer 108, a first undoped or lightly doped amorphous Si layer 110, a doped amorphous Si layer 112, a gate contact 114C, and S/D contacts 114A, 114B, configured and arranged as shown. In operation of the HJFET device 100, the current ($I_{DS}$) from the drain (e.g., S/D region 110A) through the channel region 104 to the source (e.g., S/D region 106B) is controlled by varying the potential ($V_{GS}$) between the gate contact 114C and the source (e.g., S/D region 106B). It should be noted that, in contrast to conventional thin-film transistors which are typically enhancement-mode devices, HJFET is a depletion-mode device. Therefore, controlling the HJFET current by varying $V_{GS}$ is achieved by varying the width of the depletion region in the channel region 104 in contrast to varying the density of free charge accumulation in enhancement-mode devices. In one or more embodiments of the invention, the HJFETs are formed in the back-end-of-line as shown in FIG. 5.

In one or more embodiments of the invention, excimer laser annealing is used to crystalize the amorphous Si into poly-Si channel region 104. Laser wavelengths that have been used are 308 nm. The amorphous Si is deposited using known fabrication techniques such as PECVD but other techniques such as sputtering may also be used. The typical a-Si thickness is in the range of 24-100 nm. The laser beam (typically a line beam rather than a point beam) is scanned across the substrate to crystalize the amorphous Si. Typical excimer laser energy density (laser fluence) is in the range of 350-450 mJ/cm². Typical laser pulse widths are in the range of 10-50 ns and repetition rate is in the range of 100 Hz-1 KHz.

FIG. 2 depicts a cross-sectional view of a self-aligned thin-film HJFET device 200 having an insulating substrate 202, a low temperature mono or poly silicon channel region 204, sidewall spacer layer 206, source/drain (S/D) regions 208A, 208B, a first undoped or lightly doped amorphous Si layer 210, a doped amorphous Si layer 212, dielectric spacers 214, a gate contact 216C, and S/D contacts 216A, 216B, configured and arranged as shown. In operation of the HJFET device 200, the current ($I_{DS}$) from the drain (e.g., S/D region 110A) through the channel region 104 to the source (e.g., S/D region 110B) is controlled by varying the potential ($V_{GS}$) between the gate contact 114C and the source (e.g., S/D region 106B). In one or more embodiments of the invention, the HJFETs are formed in the back-end-of-line as shown in FIG. 5.

Figure 3:
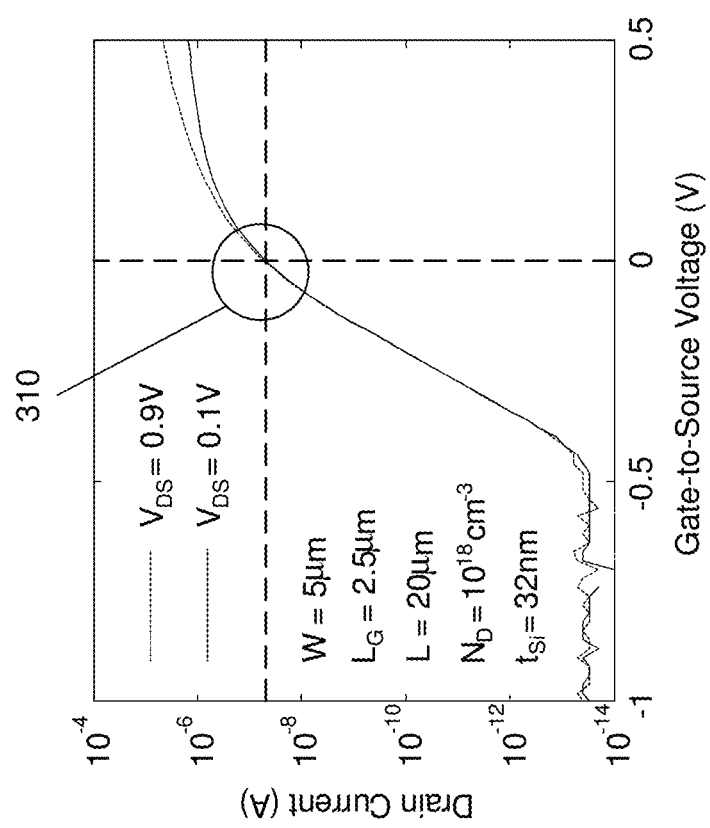
FIG. 3 illustrates a biasing of a transistor based on a drain current as a function of the gate-to-source voltage of the transistor, according to an embodiment of the invention.

FIG. 3 illustrates a biasing of a transistor based on a drain current, $I_D$, as a function of the gate-to-source voltage, $V_GS$, of the transistor, according to an embodiment of the invention. The example of FIG. 3 depicts the measured transfer characteristics 300 of an example n-channel HJFET having an underlapped structure for an example drain-to-source voltage of 0.9V and an example drain-to-source voltage of 0.1V. The example HJFET has a channel width (W) of 5 microns, a gate length ($L_G$) of 2.5 microns, a channel length (L) of 20 microns, a doping concentration ($N_D$) of $10^{18}$ cm$^{-3}$, and a c-Si thickness ($t_{Si}$) of 32 nano-meters.

As shown in FIG. 3, an optimal biasing point 310 includes a point along the transfer curve with a highest slope, i.e., highest derivate of ID with respect to $V_{GS}$ (therefore resulting in the highest $g_m$ and thus gain) at a substantially lowest drain current (and therefore lowest power consumption). As apparent to those skilled in the art, this optimal bias point corresponds to the onset of the subthreshold regime and is therefore close to the HJFET pinch-off voltage (or the TFT threshold voltage). In the example of FIG. 3, the HJFET has a pinch-off voltage approximately equal to zero. A pinch-off voltage (or threshold voltage) of about zero allows biasing an amplifying transistor at the optimal bias point (e.g., with a $V_{GS}$ of zero) without requiring an additional power supply or a bias circuit (e.g., a resistive voltage divider) that consumes standby power. Moreover, an active load may be implemented by connecting the gate and source of a transistor without requiring a bias voltage between gate and source. As noted above, in one or more embodiments, the amplifying transistors 1120 and active loads 1340 of each stage 110 (of FIG. 13) are biased in a sub-threshold regime at a $V_{GS}$ equal to approximately the pinch-off voltage (or threshold voltage of the transistor), as shown in FIG. 3. In some embodiments, the pinch-off voltage (or threshold voltage) of the amplifying transistors and the active loads is approximately zero volts, which is the case for the HJFET characterized in FIG. 3.

FIG. 4 illustrates a design of an HJFET to obtain a desired pinch-off voltage of the transistor by choosing an appropriate combination of a silicon thickness ($t_{Si}$) and a doping concentration ($N_D$), according to one or more embodiments of the invention. FIG. 4 illustrates constant pinch-off voltage ($V_p$) contours for a pinch-off voltage of −2V and a pinch-off voltage of 0V. For a given doping concentration, the silicon thickness may be adjusted to obtain a desired pinch-off voltage, e.g., zero volts. Alternatively, for a given silicon thickness, the doping concentration may be adjusted to obtain a desired pinch-off voltage, e.g., zero volts. Similarly, the device parameters of a TFT may also be adjusted to obtain a desired threshold voltage, as known in the art. Such device parameters of a TFT may include, e.g., the gate dielectric capacitance, the gate electrode work-function and the channel doping concentration.

It is noted that the term "pinch-off" voltage is commonly used for (hetero) junction field effect transistors and the term "threshold voltage" is commonly used for metal oxide field effect transistors. As known in the art, the basic device parameters (including threshold voltage) and operation principles of conventional TFTs are the same as or similar to metal-oxide field-effect transistors (MOSFETs), and the basic device parameters (including pinch-off voltage) and operation principles of HJFETs are the same as or similar to junction field-effect transistors (JFETs). Therefore, from a circuit design perspective, a conventional TFT may be essentially treated as a MOSFET, and an HJFET may be essentially treated as a JFET. Furthermore, since JFETs and MOSFETs are both field-effect transistors, certain operation aspects and device parameters of JFETs and MOSFETs or analogous or essentially the same. For instance, from a circuit design perspective, a pinch-off voltage can be treated the same as a threshold voltage.

It is further noted that the HJFET equations provided herein can also be applied to the TFTs by replacing the HJFET pinch-off voltage with the TFT threshold voltage, as would be apparent to a person of ordinary skill in the art. Moreover, the equations provided herein for n-channel devices are readily applicable to p-channel devices with minor adjustments to account for the opposite carrier types and voltage polarities, as would be again apparent to a person of ordinary skill in the art.

In FIG. 5, a schematic cross-section of a low-power random number generator circuit 500 in accordance with one or more embodiments is shown. In FIG. 5, the front-end 510 of the circuit includes a plurality of devices 512, 514, 516. In one or more embodiments of the invention, the front-end devices are CMOS devices. The back-end 520 of the circuit 500 includes a plurality of devices 522, 524, 526. In one or more embodiments of the invention, the back-end devices are HJFET such as those shown in FIGS. 1 and 2. The HJFETs includes a polysilicon layer 530, 532, 534 which is formed using a laser and can be coupled to the front-end devices through contacts such as metal connection 540.

CMOS transistors are fabricated in the front-end with known low-power design techniques for CMOS transistors. During fabrication one or more inter-layer dielectric (ILD)/metallization levels 502, 504, and 506 are fabricated as needed for the circuitry. In one or more embodiments of the invention, an HJFET is fabricated in the back-end by preparing laser-crystallized polysilicon layer 530, 532, 534, followed by HJFET fabrication. In embodiments of the invention, the crystallized polysilicon is formed using an excimer laser. In one or more embodiments of the invention, the laser crystallization of a-Si is performed using laser irradiation conditions widely used in manufacturing of thin-film transistors for displays. The crystallization depth can be accurately controlled by adjusting the laser pulse energy and duration. Due to short laser pulses, local heating and fast dissipation, a-Si can be crystallized at low temperatures. These techniques are compatible with back-end-of-line fabrication techniques and the HJFET is formed in the back-end using compatible PECVD deposition. Subsequently, one or more ILD/metallization levels are formed for the HJFET circuitry and the connections are made to the devices formed on the front end.

Figure 6:
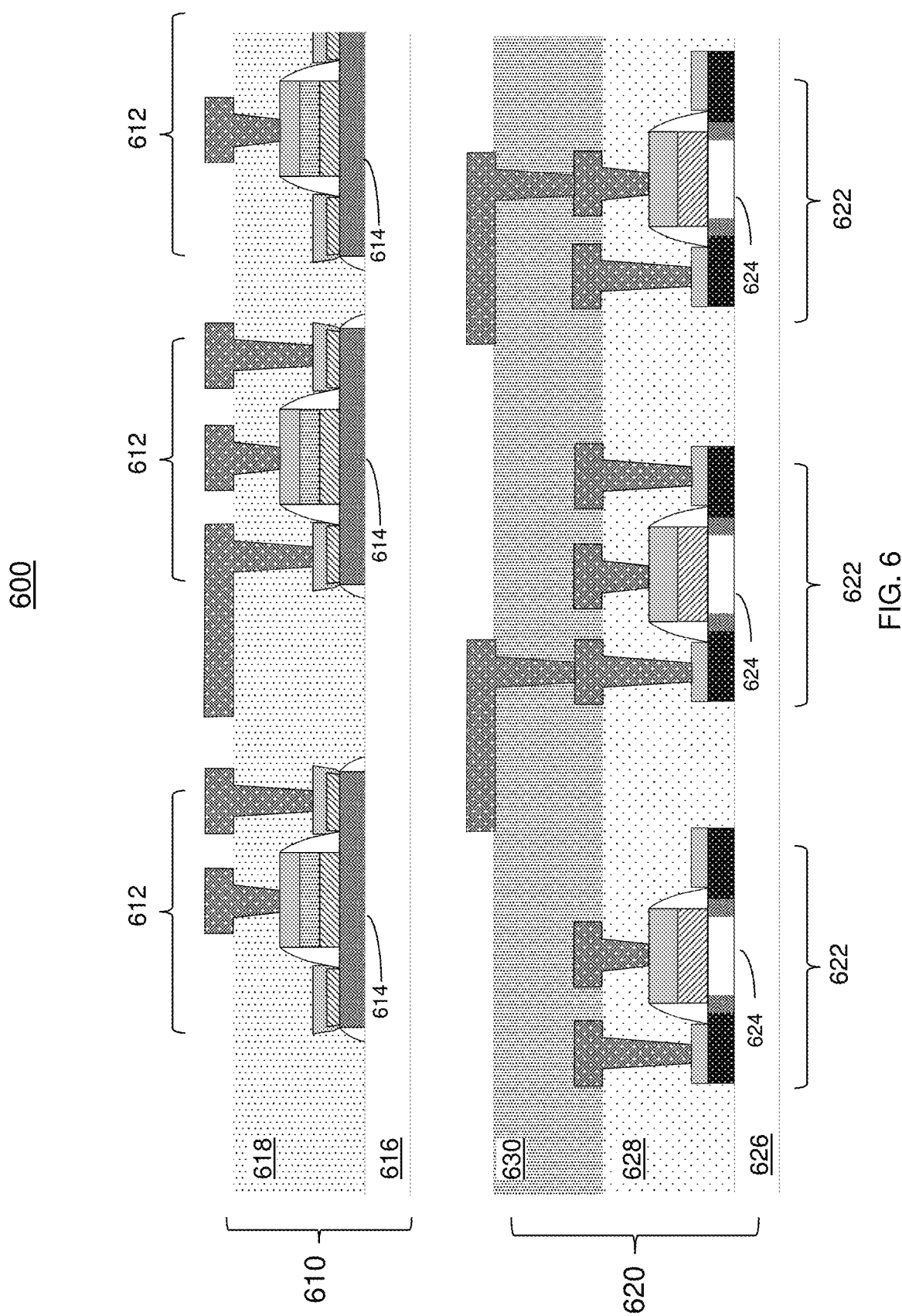
FIG. 6 depicts a cross-section of a circuit having a CMOS chip and an HJFET chip bonded together in accordance with one or more embodiments of the invention.

In FIG. 6, a schematic cross-section of a low-power random number generator circuit 600 prior to bonding in accordance with one or more embodiments is shown. A first chip 610 is bonded to a second chip 620 using techniques known in the art, such as flip-chip bonding. In one or more embodiments of the invention, the first chip 610 is an HJFET chip and the second chip 620 is a CMOS chip. In FIG. 6, the first chip 610, an HJFET chip, can include one or more devices 612. In some embodiments of the invention, the devices 612 are HJFET such as those shown in FIGS. 1 and 2. The devices 612 can be fabricated separately on SOI substrates and are formed on a buried oxide (BOX) dielectric layer 616. In one or more embodiments of the invention, the HJFET is fabricated in the back-end by preparing laser-crystallized polysilicon layer 614, followed by HJFET fabrication. In embodiments of the invention, the crystallized polysilicon is formed using an excimer laser. The first chip 610 includes an ILD 618. The second chip 620, a CMOS chip, includes a front-end and back-end. FIG. 6 shows the front-end includes a plurality of devices 622. The CMOS chip as shown is formed on a BOX 626. The front-end of the second chip 620 include an ILD 628 and the back-end includes an ILD 630. In one or more embodiments of the invention, the first chip 610 and the second chip 620 can be formed independently of one another. After forming the first chip 610 and the second chip 620, the first chip 610 is bonded to the second chip 620 to form the low-power random number generator device 600. In some embodiments, the back-end of the second chip 620 is bonded to the BOX 616 of the first-chip 610. As shown in FIG. 6, the first chip 610 and second chip 620 includes interconnects and contacts for providing electrical signals.

Figure 7:
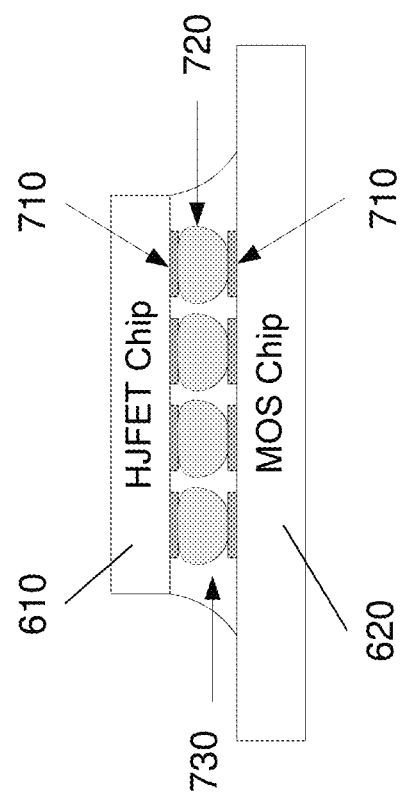
FIG. 7 depicts metal pads and solder bonds that are used in a chip bonding process in accordance with one or more embodiments of the invention.

In FIG. 7, a non-limiting example of a first chip 610 that has been bonded to the second chip 620 is shown. In one or more embodiments the first chip 610 is the HJFET and the second chip 620 is the MOS chip shown in FIG. 6. The first and second chip 610, 620 includes metal pads 710 that are affixed to a side of the first and second chip 610, 620. The metal pads 710 provide a surface for connecting to the solder balls 720 during the bonding process. The underfill 730 provides space for the solder balls 720 to expand during the bonding process.

Figure 8:
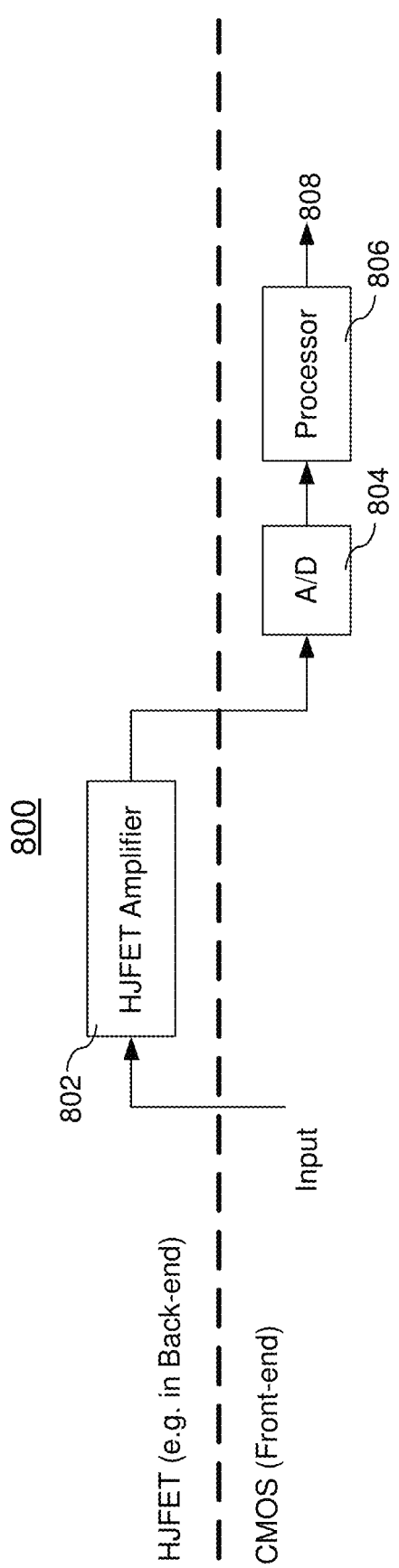
FIG. 8 depicts a low-power random number generating circuit including an A/D converter and processor in accordance with one or more embodiments of the invention.

In FIG. 8, an integrated circuit 800 in accordance with one or more embodiments of the invention is shown. The HJFET amplifier 802 includes one or more HJFETs which are fabricated in the back-end of the integrated circuit 800 as described above in reference to FIGS. 5 and 6. The HJFET 802 amplifier is configured to receive an input from a device on the front-end such as the CMOS discussed in FIGS. 5 and 6. The input is amplified by the HJFET 802 and sent back to a device on the front-end. In one or more embodiments of the invention, the front-end of the integrated circuit includes an analog-to-digital (A/D) converter 804 and the processor 806 to process the converted signal. In other embodiments of the invention, the input is generated from the thermal noise generated by the back-end devices, such as the bias network of an HJFET (shown in FIG. 12) or the thermal noise generated from the HJFET itself. The processed signal 808 can be used for random number generation, key generation, etc. or transmitted to another chip or system for further processing/storage.

Figure 9:
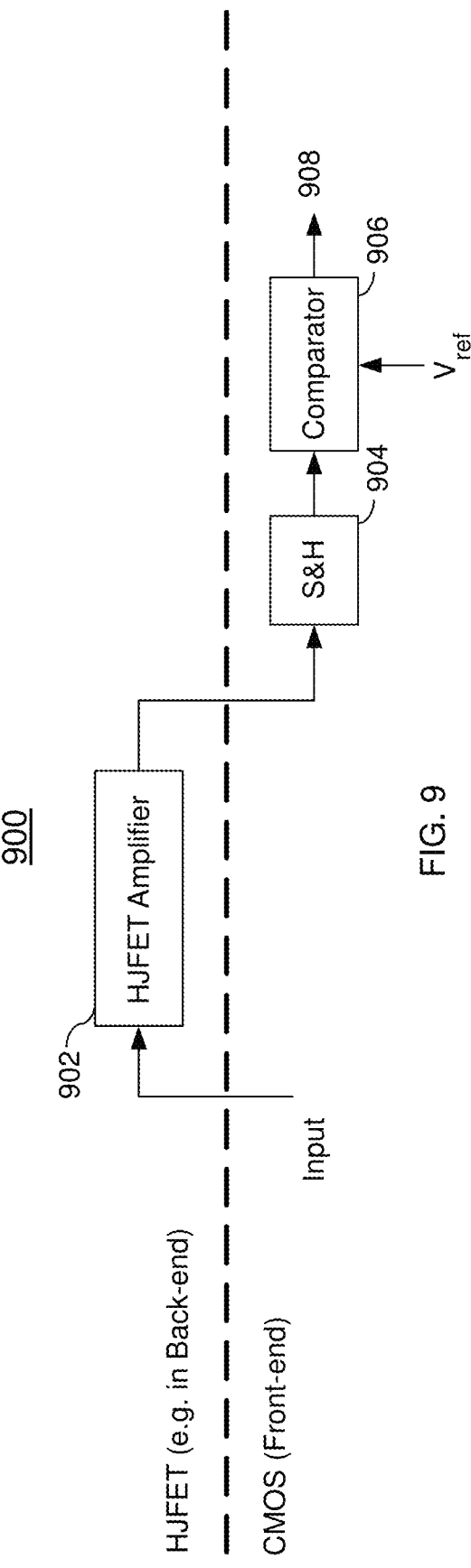
FIG. 9 depicts a low-power random number generating circuit including sample and hold circuit and comparator in accordance with one or more embodiments of the invention.

In FIG. 9, another circuit configuration 900 in accordance with one or more embodiments of the invention is shown. The HJFET amplifier 902 is fabricated in the back-end of the circuit 900 as described above in reference to FIGS. 5 and 6. The HJFET amplifier 902 is configured to receive an input from a device in the front-end such as the CMOS discussed in FIGS. 5 and 6. In other embodiments of the invention, the input is generated from the thermal noise generated by the back-end devices, such as the bias network of an HJFET within the HJFET amplifier 902 or the thermal noise generated from an HJFET itself within the HJFET amplifier 902.

The input is amplified by the HJFET amplifier 902 and sent back to a device on the front-end. A sample and hold circuit 904 (S&H), which is incorporated in the front-end of the circuit 900, is configured to receive the output of the HJFET amplifier 902. The comparator 906 is configured to receive a reference signal $V_{ref}$ and the output of the S&H circuit 904 to determine an output signal 708. The S&H circuit 704 samples the amplified noise signal from the HJFET amplifier 902 and compares the signal to the $V_{ref}$ to generate a 0 or 1 based on the comparison producing a negative or positive result, respectively. The output signal 908 can be used for random number generation, key generation, etc. or transmitted to another chip or system for further processing/storage. In some embodiments, a capacitor is connected in series between the output of the HJFET amplifier 902 and the input of the sample and hold circuit (S&H) to block the DC portion of the output of the HJFET amplifier 902, and $V_{ref}$ is set to zero. As apparent to those skilled in the art, the said series capacitor also blocks a low-frequency portion of the output of the HJFET amplifier 902, therefore the value of the series capacitor should be chosen sufficiently large to prevent blocking of the low frequencies of interest.

Figure 10:
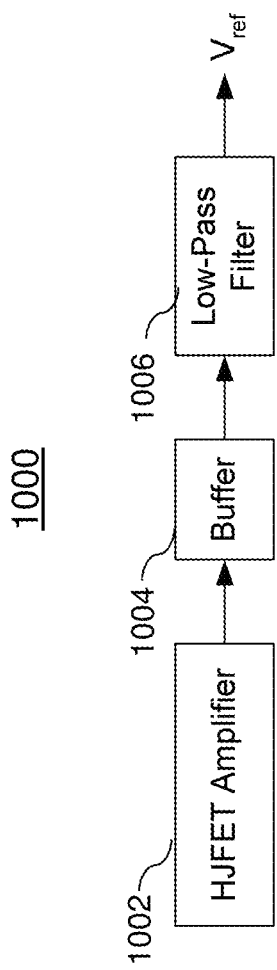
FIG. 10 depicts a calibration technique for the sample and hold circuit in accordance with one or more embodiments of the invention.
Figure 11:
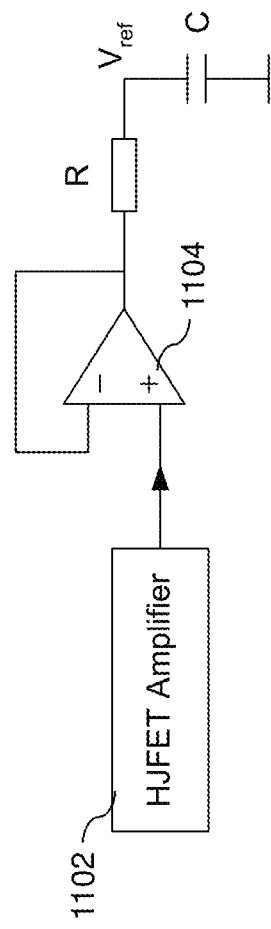
FIG. 11 depicts a calibration technique for the sample and hold circuit in accordance with one or more embodiments of the invention.

In FIG. 10, the circuit configuration 1000 includes an HJFET amplifier 1002 that is configured with a low-pass filter 1006 in accordance with one or more embodiments of the invention. In one or more embodiments of the invention, the reference signal $V_{ref}$ used for the random number generation may need to be calibrated to ensure the statistical probability of generating a random 0 is the same as that of a random 1. For example, the calibration may be performed to prevent the number generator from producing too many 1s or too many 0s as a result of the $V_{ref}$ shifting over time. The drift of $V_{ref}$ may occur as a result of the drift of the device characteristics. Techniques to calibrate the reference voltage for the sample and hold circuit 902 of FIG. 9 include averaging the signal using a buffer 1004 and low pass filter 1006 to produce the reference signal $V_{ref}$. In some embodiments of the invention, the low-pass filter 1006 is used to filter higher frequency variations prior to performing the sampling. In one or more embodiments of the invention, the sampling circuit itself may function as a low-pass filter. An exemplary implementation of the circuit configuration 1000 of FIG. 10 is provided in FIG. 11, which depicts a circuit 1100 in accordance with one or more embodiments of the invention. The circuit 1100 includes an HJFET amplifier 1102 that is coupled to an operation amplifier 1104 (OPAMP), where the inverting (-) input of the OPAMP is connected to its output to create a voltage buffer. The output of the buffer is connected to a passive low pass filter including a resistor-capacitor RC to produce the $V_{ref}$ to be provided as a reference signal such as to S&H circuit 904 for performing a random number generation. Also the output of the operational amplifier 1104 provides feedback to the input of the operational amplifier 1104 to prevent the reference signal $V_{ref}$ from drifting away from the configured reference point. In other embodiments, an active low-pass filter (which may contain an OPAMP in its circuit) may be used instead of a passive low-pass filter. As known in the art, an active low-pass filter may be designed to have a high input impedance and therefore eliminate the need for a buffer between the HJFET amplifier 1102 and the active low-pass filter.

Figure 12:
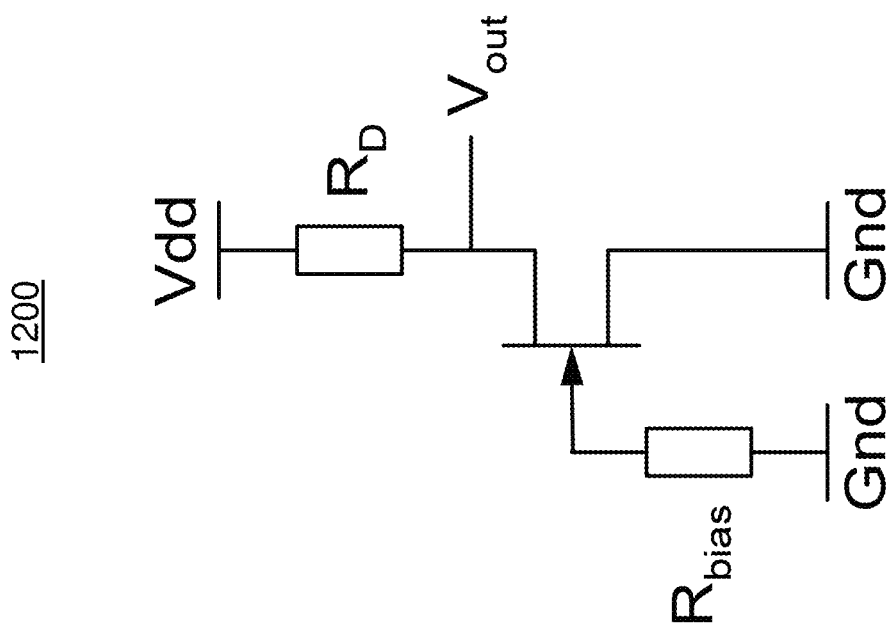
FIG. 12 depicts a bias configuration of an HJFET in accordance with one or more embodiments of the invention.

In FIG. 12, a single-stage HJFET amplifier 1200 comprised of a single HJFET and a resistive bias network for the HJFET in accordance with one or more embodiments of the invention is shown. The HJFET amplifier 1000 includes a resistor $R_{bias}$ that is coupled to the gate of the HJFET and ground GND. A resistor $R_D$ is coupled to the drain of the HJFET and power supply voltage $V_{dd}$, and the source of the HJFET 1200 is coupled to ground GND. As will be discussed later with respect to FIGS. 13 and 14, one or both resistors $R_D$ and $R_{bias}$ may be replaced by active loads. An active load may be implemented by connecting the gate terminal of an HJFET to its source terminal. The following Equations 1-3 describe how to configure the HJFET to obtain the desired gain for HJFET amplifier 1200. In one or more embodiments of the invention, the HJFET is biased in the subthreshold regime to achieve high gain and high output impedance at a low drive current.

$$V_{bi} \approx E_g/2q + (kT/q)\ln(N_D/n_i) \quad \text{(Eq. 1)}$$

$$V_p \approx V_{bi} - (qN_D/2\varepsilon_{si})t_{Si}^2 \quad \text{(Eq. 2)}$$

$$I_D \approx I_{D0} \exp[q(V_{GS}-V_p)/nkT][1-\exp(-qV_{DS}/kT)] \quad \text{(Eq. 3)}$$

where: $V_{bi}$: built-in potential of gate heterojunction; $V_p$: pinch-off voltage of HJFET; $E_g$: bandgap of crystalline silicon (c-Si) (e.g., LTPS (low-temperature polycrystalline silicon)); $N_D$: c-Si doping; $n_i$: intrinsic carrier density in c-Si; $t_{si}$: c-Si thickness; k: Boltzmann Constant; T: absolute temperature; q: electron charge; $I_{D0}$: HJFET drain current at $V_{GS}=V_p$ and $V_{DS} \gg kT/q$ (i.e., the thermal voltage, which is ~26 mV at room temperature); and n: ideality factor of the HJFET drain current ($1 \leq n \leq 2$). The transconductance, $g_m$, can be expressed in Equation 4 as follows:

$$g_m = \partial I_D/\partial V_{GS} = qI_D/nkT \quad \text{(Eq. 4)}$$

The output resistance, $r_{out}$, can be expressed in Equation 5 as follows:

$$r_{out} = (\partial I_D/\partial V_{DS})^{-1} = (kT/qI_D)\exp(qV_{DS}/kT) \quad \text{(Eq. 5)}$$

This example demonstrates a moderately high transconductance, $g_m$, despite a low HJFET drain current, $I_D$. For instance, if $I_D=50$ nA and n=1.3, then $g_m \approx 1.5$ µA/V at room-temperature. In addition, the example demonstrates a high output resistance, $r_{out}$, so far as $V_{DS} \gg kT/q$. For instance, if $I_D=50$ nA and $V_{DS}=0.25$V, then $r_{out} \approx 8$ GΩ, at room-temperature. It should be noted that in practice $r_{out}$ may be smaller due to non-idealities not included in Eq. 5, such as channel length modulation, as would be apparent to a person of ordinary skill in the art.

The low-frequency voltage gain (AV) of the single-stage HJFET amplifier 1000 is approximately equal to $g_m(r_{out}||R_D)$, where "||" denotes parallel connection. Assuming that $r_{out}$ is much larger than $R_D$, the low-frequency voltage gain ($A_V$) can be further approximated as $g_m R_D$. In an embodiment of the invention, the HJFET and its resistive bias network are used as a source of noise for random number generation. The generated noise can be described by the following Equation 6:

$$V^2_{n,out} = [4kT(2/3g_m)]A_V^2 + 4kTR_D + 4kTR_{bias}A_V^2 \quad \text{(Eq. 6)}$$

where $V^2_{n,out}$ represents the output noise voltage, the term 4 kT (2/3$g_m$) represents the thermal noise of HJFET; the term 4 kT $R_D$ the represents the thermal noise of $R_D$; and the term 4 kT $R_{bias}$ represents the thermal noise of $R_{bias}$. The flicker noise of HJFET is relatively small and therefore not included in Eq. 6. In embodiments where the HJFET amplifier 1200 also receives a noise input from the front end, Eq. 6 includes an additional term equal to the noise input multiplied by the amplifier gain. In embodiments where $R_D$ is replaced with an active load, the output resistance of the HJFET used as the active load may be used instead of $R_D$ in Eq. 6. For conventional TFTs, Eqs. 1 and 2 must be replaced with well-known equations for threshold voltage, pinch-off voltage ($V_p$) in Eq. 3 must be replaced with threshold voltage ($V_T$), and Eqs. 4-6 may be used without change. In embodiments where conventional TFTs are used, the flicker noise of the TFT may be considerable. An additional term [$K_f$/($WLC_{ox}f$)]$A_V^2$, where $K_f$ is a flicker noise constant, W is the TFT channel width, L is the TFT channel length, $C_{ox}$, is the TFT gate dielectric capacitance per unit gate area and f is the frequency, may be added to Eq. 6 to represent the contribution of the TFT flicker noise.

Figure 13:
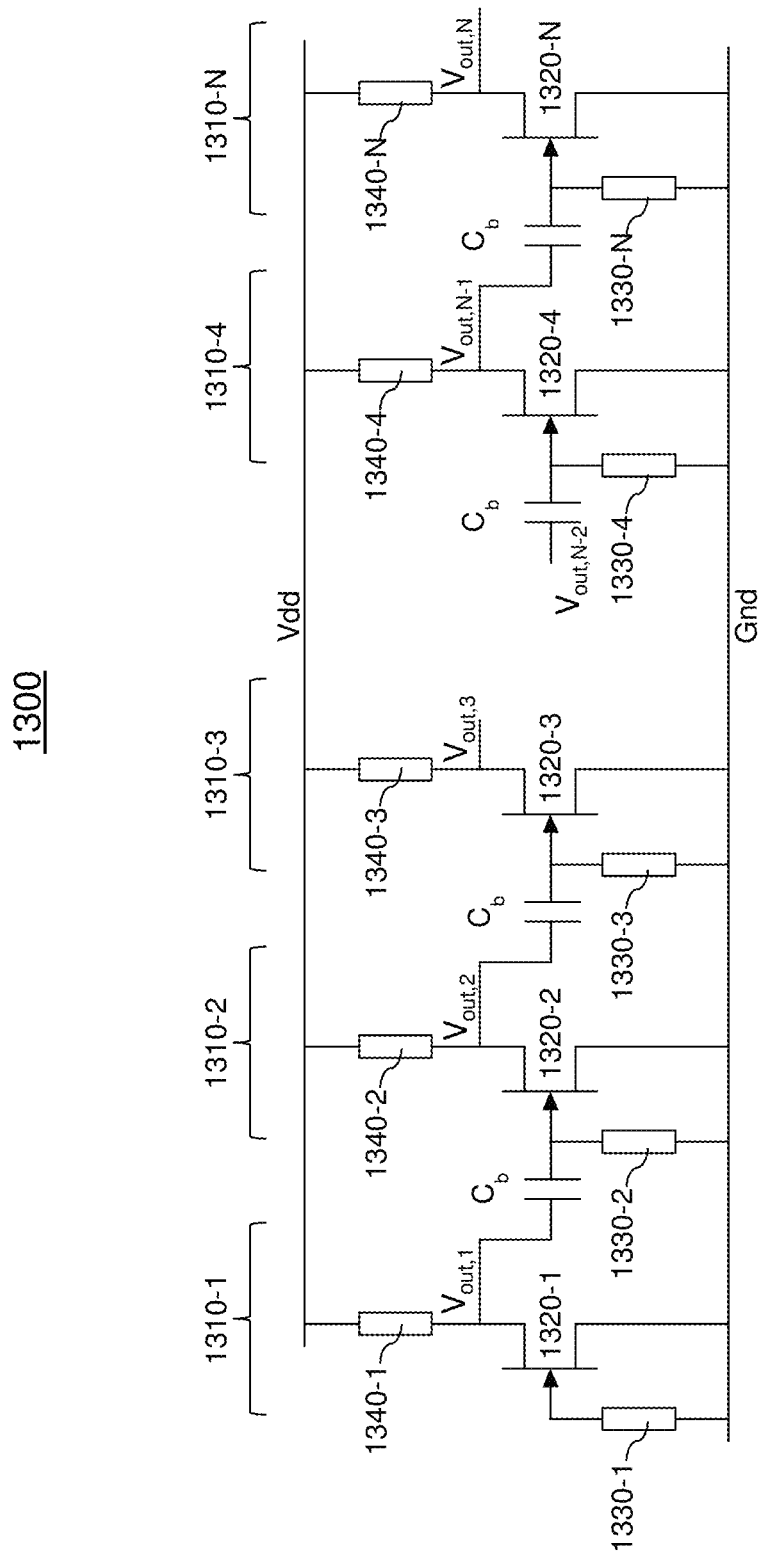
FIG. 13 depicts a multi-stage amplifier in accordance with one or more embodiments of the invention.

In FIG. 13, a multistage (cascade) amplifier 1300 in accordance with one or more embodiments of the invention is shown. FIG. 13 depicts a multi-stage amplifier 1300, according to an embodiment of the invention. As shown in FIG. 13, the multi-stage amplifier 1300 includes a plurality of amplification stages 1310-1 through 1310-N. As shown in FIG. 13, the output $V_{out,N}$ of each stage is coupled to the following stage using a capacitor $C_b$. Each of the amplification stages 1310 includes an amplifying transistor 1320-1 through 1320-N. Each of the amplification stages 1310 includes a resistor 1330-1 through 1330-N coupled to the gate of each amplifying transistor 1320 and resistor 1340-1 through 1340-N coupled to the drain. The amplifying transistors 1320 may be implemented, for example, as n-channel heterojunction field effect transistors or n-channel metal oxide semiconductor field effect transistors.

In the embodiment of FIG. 13, a relatively high-frequency portion of an output of a given amplification stage 1310-$i$ is directly applied as an input to a subsequent amplification stage 1310-$i$+1, whereas the DC portion and a relatively low-frequency portion of the output is blocked from being transferred to the subsequent stage by capacitor $C_b$. The inputs of all amplification stages receive DC inputs of zero volts through the bias resistors 1330. In one or more embodiments, the amplifying transistors 1320 of each stage 1310 are biased in a sub-threshold regime at a $V_{GS}$ equal to approximately the pinch-off voltage (or threshold voltage) of the transistors, as discussed further below in conjunction with FIG. 3. In some embodiments, the amplifying transistors 1320 of each stage 1310 have a pinch-off voltage or a threshold voltage of about zero volts. As discussed further below in conjunction with FIG. 4, the transistor parameters may be chosen properly during device fabrication to result in a desired pinch-off voltage (or a threshold voltage), e.g., zero volts. As noted above, in one or more embodiments, the amplifying transistors 1320 of each stage 1310 can have a pinch-off voltage or a threshold voltage of about zero volts.

Figure 14:
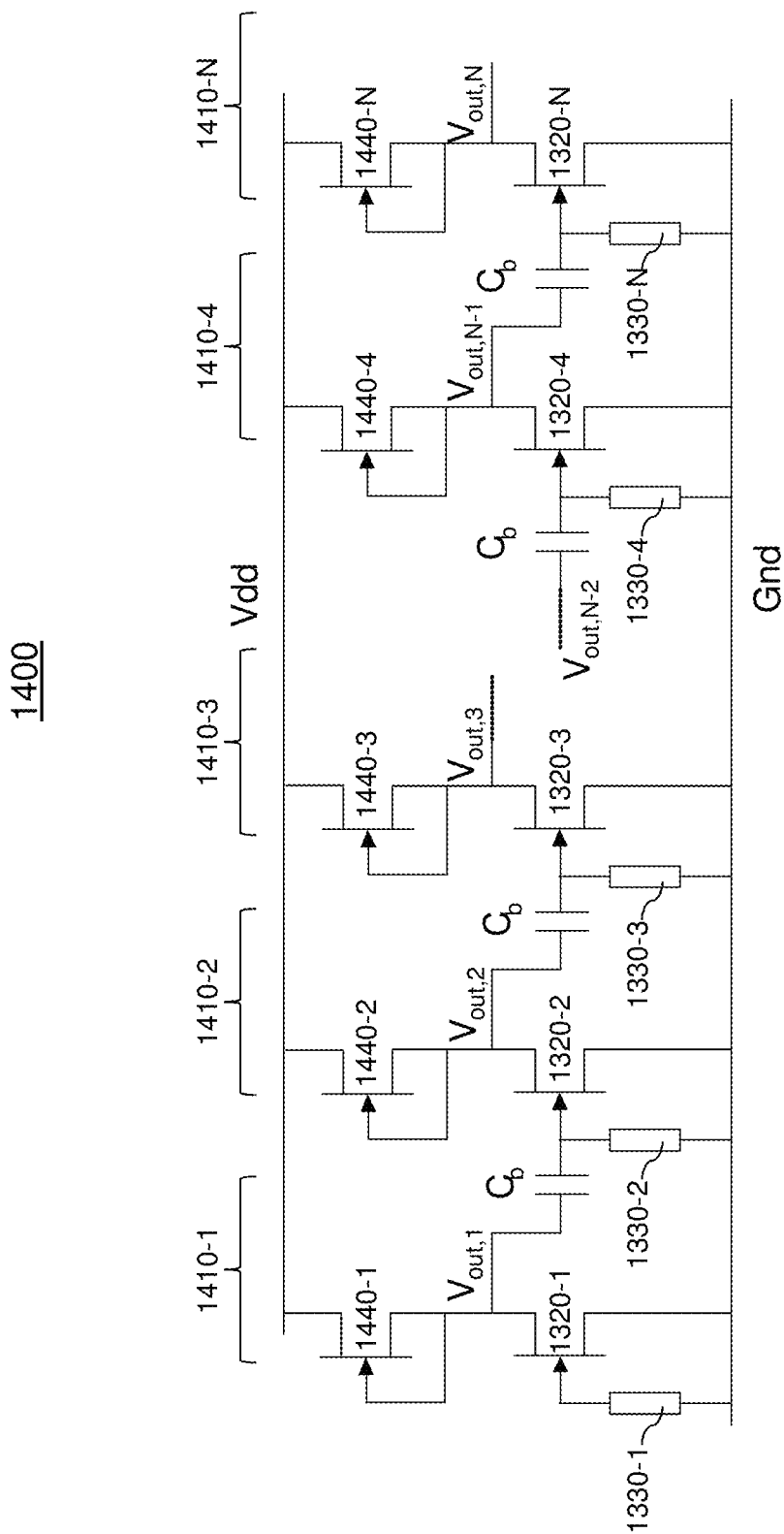
FIG. 14 depicts a multi-stage amplifier in accordance with one or more embodiments of the invention.

FIG. 14 provides another configuration for the multi-stage amplifier 1400 where the resistors 1340-1 through 1340-N are replaced with active load devices 1440-1 through 1440-N is shown. The amplifying transistors 1320 and active loads 1440 of each of the amplification stages 1410-1 through 1410-N may be implemented, for example, as n-channel heterojunction field effect transistors or n-channel metal oxide semiconductor field effect transistors. In the example of FIG. 14, the amplifying transistors 1320 and active loads 1440 include n-channel heterojunction field-effect transistors having transfer characteristics as depicted in FIG. 3. In one or more embodiments, the amplifying transistors 1320 and active loads 1440 of each stage are biased in a sub-threshold regime at a $V_{GS}$ equal to approximately the pinch-off voltage (or threshold voltage) of the transistors. In some embodiments, the amplifying transistors 1320 and active loads 1440 of each stage have a pinch-off voltage or a threshold voltage of about zero volts.

Figure 15:
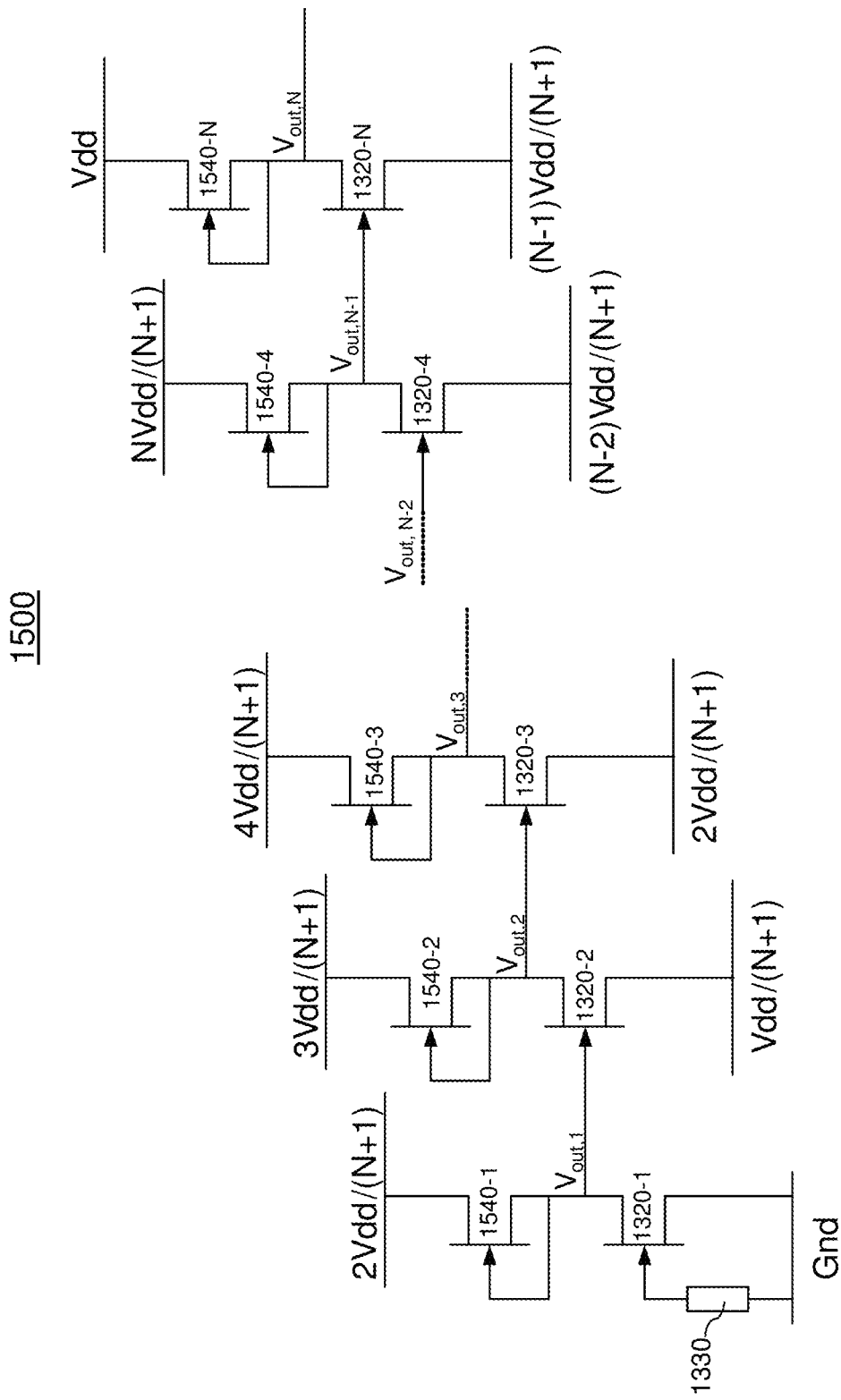
FIG. 15 depicts a multi-stage amplifier in accordance with one or more embodiments of the invention.

In FIG. 15, another configuration of the multi-stage amplifier 1300 of FIG. 13 according to an embodiment of the invention is shown. In the multi-stage amplifier 15, each stage is directly coupled to the next stage without a capacitor $C_b$ shown in FIG. 13. As shown in FIG. 15, the multi-stage amplifier 1500 includes a plurality of amplification stages. Each of the amplification stages includes an amplifying transistor 1320 and an active load 1540. The amplifying transistors 1520 and active loads 1540 may be implemented, for example, as n-channel heterojunction field effect transistors or n-channel metal oxide semiconductor field effect transistors. In the example of FIG. 15, the amplifying transistors 1320 and active loads 1540 are n-channel heterojunction field-effect transistors having transfer characteristics as depicted in FIG. 3.

In one or more embodiments of the invention, the amplification stages have an increasing bias supply level relative to a prior stage. When the amplifying transistors 1320 of each stage are implemented using n-channel devices, the bias supply level will increase for each successive stage. In the embodiment of FIG. 1, the bias supply levels increase in equal steps; however, in other embodiments the bias supply levels may not increase (or decrease) in equal steps. Increasing the bias supply levels allows the output DC level of a stage 1320-$i$ to be used as the input DC level to the following stage 1320-$i$+1. In the absence of $C_b$, there is no blockage of the low-frequency noise generated by a stage, therefore resulting in stronger output noise at low frequencies compared to the multi-stage amplifiers of FIGS. 13 and 14. The higher power low-frequency noise is beneficial in reducing power consumption in embodiments where random numbers are generated at slow rates.

The technical effects and benefits of the hybrid system with the ultra-low-power thin-film HJFET amplifiers coupled to a semiconductor CMOS chip for generating noise for random number generation. The HJFET amplifier may receive a weak noisy signal (from the semiconductor chip for amplification such as MOS flicker noise and/or receive the thermal noise of the resistive bias network within the HJFET amplifier itself. The output of the HJFET amplifier is transferred to the semiconductor chip for further processing such as generating random numbers for use in encryption keys. The HJFET amplifier may be fabricated in the back-end-of-line without increasing the footprint.

The methods and resulting structures described herein can be used in the fabrication of IC chips. The resulting IC chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes IC chips, ranging from toys and other low-end applications to advanced computer products having a display, a keyboard or other input device, and a central processor.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Similarly, the term "coupled" and variations thereof describes having a communications path between two elements and does not imply a direct connection between the elements with no intervening elements/connections between them. All of these variations are considered a part of the specification. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

Spatially relative terms, e.g., "beneath," "below," "lower," "above," "upper," and the like, can be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device can be otherwise oriented (rotated 90 degrees or at other orientations) and the spatially relative descriptors used herein interpreted accordingly.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The phrase "selective to," such as, for example, "a first element selective to a second element," means that the first element can be etched and the second element can act as an etch stop.

The term "conformal" (e.g., a conformal layer) means that the thickness of the layer is substantially the same on all surfaces, or that the thickness variation is less than 15% of the nominal thickness of the layer.

As previously noted herein, for the sake of brevity, conventional techniques related to semiconductor device and integrated circuit (IC) fabrication may or may not be described in detail herein. By way of background, however, a more general description of the semiconductor device fabrication processes that can be utilized in implementing one or more embodiments of the present invention will now be provided. Although specific fabrication operations used in implementing one or more embodiments of the present invention can be individually known, the described combination of operations and/or resulting structures of the present invention are unique. Thus, the unique combination of the operations described in connection with the fabrication of a semiconductor device according to the present invention utilize a variety of individually known physical and chemical processes performed on a semiconductor (e.g., silicon) substrate, some of which are described in the immediately following paragraphs.

In general, the various processes used to form a microchip that will be packaged into an IC fall into four general categories, namely, film deposition, removal/etching, semiconductor doping and patterning/lithography. Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others. Removal/etching is any process that removes material from the wafer. Examples include etch processes (either wet or dry), chemical-mechanical planarization (CMP), and the like. Reactive ion etching (RIE), for example, is a type of dry etching that uses chemically reactive plasma to remove a material, such as a masked pattern of semiconductor material, by exposing the material to a bombardment of ions that dislodge portions of the material from the exposed surface. The plasma is typically generated under low pressure (vacuum) by an electromagnetic field. Semiconductor doping is the modification of electrical properties by doping, for example, transistor sources and drains, generally by diffusion and/or by ion implantation. These doping processes are followed by furnace annealing or by rapid thermal annealing (RTA). Annealing serves to activate the implanted dopants. Films of both conductors (e.g., poly-silicon, aluminum, copper, etc.) and insulators (e.g., various forms of silicon dioxide, silicon nitride, etc.) are used to connect and isolate transistors and their components. Selective doping of various regions of the semiconductor substrate allows the conductivity of the substrate to be changed with the application of voltage. By creating structures of these various components, millions of transistors can be built and wired together to form the complex circuitry of a modern microelectronic device. Semiconductor lithography is the formation of three-dimensional relief images or patterns on the semiconductor substrate for subsequent transfer of the pattern to the substrate. In semiconductor lithography, the patterns are formed by a light sensitive polymer called a photo-resist. To build the complex structures that make up a transistor and the many wires that connect the millions of transistors of a circuit, lithography and etch pattern transfer steps are repeated multiple times. Each pattern being printed on the wafer is aligned to the previously formed patterns and slowly the conductors, insulators and selectively doped regions are built up to form the final device.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. An integrated circuit comprising:
one or more front-end devices formed on a substrate;
one or more interlayer dielectric (ILD) layers formed on the one or more front-end devices;
one or more back-end devices formed on the one or more ILD layers, wherein the one or more back-end devices are configured to amplify a noise signal and transmit an amplified noise signal to the one or more front-end devices for processing, wherein the one or more front-end devices are connected to the one or more back-end devices.

2. The integrated circuit of 1, wherein the noise signal is at least one of a flicker noise of the one or more front-end device or a thermal noise of the one or more back-end devices.

3. The integrated circuit of claim 2, wherein the noise signal is from a complementary metal oxide semiconductor device of the one or more front-end devices.

4. The integrated circuit of claim 2, wherein the thermal noise is from a resistive bias network of the one or more back-end devices.

5. The integrated circuit of claim 1, wherein an analog-to-digital (A/D) converter circuit comprising the one or more front-end devices is configured to receive the amplified noise signal from the one or more back-end devices and is configured to generate a random number sequence using the amplified noise signal.

6. The integrated circuit of claim 1, wherein a sample and hold circuit comprising the one or more front-end devices is configured to receive the amplified noise signal from the one or more back-end devices and is configured to generate a random number sequence using the amplified noise signal.

7. The integrated circuit of claim 6 further comprising calibrating a reference signal for a comparator of the sample and hold circuit, wherein the calibration comprises averaging a DC output of the one or more back-end devices using a low pass filter.

8. The integrated circuit of 1, wherein the one or more back-end devices are configured to amplify the noise signal received from the one or more front-end devices.

9. The integrated circuit of 1, wherein the one or more back-end devices are heterojunction field effect transistors (HJFETs).

10. The integrated circuit of claim 9, wherein the HJFETs have a threshold voltage of about zero volts.

11. The integrated circuit of claim 9, wherein the HJFETs are biased in a sub-threshold regime.

12. A method for operating low-power random number generator that uses a thin-film transistor, the method comprising:
obtaining, by back end-devices, a noise signal;
amplifying the noise signal by the back-end devices, wherein the back-end devices are heterojunction field effect transistors (HJFETs), and the HJFETs are configured in a multi-stage amplifier to amplify the obtained noise signal received;
transmitting the amplified noise signal to front-end devices for processing; and
generating a random number sequence based at least in part on the amplified noise signal.

13. The method of claim 12, wherein the obtained noise signal is at least one of flicker noise from a complementary metal oxide semiconductor device of the front-end devices, thermal noise from a resistive bias network of back-end devices, or the noise signal of a back-end device itself.

14. The method of claim 13, wherein the front-end devices include a sample and hold circuit configured to receive an amplified noise signal from the one or more back-end devices and further comprising generating a random number sequence using the amplified noise signal, and further comprising calibrating a reference signal for the sample and hold circuit, wherein the calibration comprises averaging a DC output of the back-end devices using a low pass filter.

15. The method of claim 12, wherein an analog-to-digital A/D converter consisting of the front-end devices is configured to receive an amplified noise signal from the back-end devices and further comprising generating a random number sequence based at least in part on the amplified noise signal.

16. The method of claim 12, wherein the HJFETs have a threshold voltage of about zero volts, or wherein the HJFETS are biased in a sub-threshold regime.

17. An integrated circuit comprising:
a plurality of front-devices coupled to a plurality of back-end devices, wherein the plurality of back-end devices comprises a plurality of amplification stages to amplify a noise signal, wherein each of the amplification stages comprises an heterojunction field effect transistor and an active load, wherein the amplification stages have one or more of an increasing DC bias level and a decreasing DC bias level relative to a prior stage, and wherein an output of a given one of the amplification stages is directly applied as an input to a subsequent one of the amplification stages.

18. The integrated circuit of claim 17, wherein the noise signal is at least one of flicker noise from a complementary metal oxide semiconductor device of the plurality of front-end devices or thermal noise from a resistive bias network of a heterojunction field effect transistor of the plurality of back-end devices.

19. The integrated circuit of claim 17, wherein the plurality of front-end devices include at least one of an analog-to-digital A/D converter or a sample and hold circuit configured to receive an amplified noise signal from the plurality of back-end devices to generate a random number sequence based at least in part on the amplified noise signal.

20. A method of forming an integrated circuit for a low power random number generator, the method comprising:
forming a first chip including one or more devices formed on a buried oxide (BOX) dielectric layer;
forming a second chip including one or more devices formed on a BOX dielectric layer, wherein the first chip is an HJFET chip and the second chip is a CMOS chip; and
bonding the first chip to the second chip to for the low power random number generator.

21. A method of claim 20, wherein the BOX dielectric layer of the first chip is bonded to the back-end-of-line of the second chip.

22. The method of claim 20, wherein bonding comprises performing flip-chip bonding wherein the first chip is bonded to the second chip.

23. The method of claim 20, wherein the second chip comprises a front-end-of-line and a back-end-of-line, wherein the one or more devices of the second chip are formed in the front-end-of-line.

24. The method of claim 23, wherein the one or more devices of the first chip and the one or more devices of the second chip are semiconductor-on-insulator devices.

* * * * *